Patented Aug. 24, 1926.

1,597,435

UNITED STATES PATENT OFFICE.

ALEX BROOKING DAVIS, OF CINCINNATI, OHIO, ASSIGNOR TO A. B. DICK COMPANY, OF CHICAGO, ILLINOIS, A CORPORATION OF ILLINOIS.

STENCIL-SHEET COATING COMPOSITION AND SHEETS MADE THEREWITH AND PROCESS OF PRODUCING THE SAME.

No Drawing.   Application filed May 26, 1925.   Serial No. 33,053.

My invention relates particularly to an emulsion suitable for the production of stencil sheet for use with duplicating machines and capable of forming homogeneous coatings on porous material such as yoshino. It consists of a water insoluble portion, a water soluble portion and, usually, an emulsifying agent which may be either water soluble or not. The water soluble portion of the emulsion contains as its principal constituent a protein or protein-like substance such as gelatin. The water insoluble portion consists preferably of a mixture of fats and waxes, and those which have at least some affinity for water are most suitable. Wool fat (Degraw), either hydrated or anhydrous (the anhydrous being known as adeps lanæ), has a remarkable affinity for water, and in certain combinations may exert a marked influence in bringing about a proper state of emulsion. I have found to be a satisfactory emulsifying agent, starch, especially ordinary corn starch, which has been gelatinized by heating for a short period at about the temperature of boiling water with a quantity of sulfonated oil (sulfonated castor oil, commonly known as turkey red oil, or sulfonated corn oil or the like). It is not, in all cases, however, necessary to use a special emulsifying agent since some constituent of either the water soluble or water insoluble phase of the emulsion may act as such an agent, this depending upon the particular composition employed.

Essentially, therefore, I produce a composition of matter employing one phase which is a highly dispersed colloid, and another phase which is a tempering agent insoluble in the medium in which the colloid is dispersed, these together constituting the primary factors of an emulsion, with or without the use of an emulsifying agent. Where an emulsifying agent is used, it may be organic in character and soluble either in the tempering agent or in the medium in which the colloid is dispersed. Thus, with gelatine dispersed in water, gelatinized starch which is soluble in water will act as the emulsifying agent.

A preferred method of practising my invention is as follows: There are melted together 100 gm. chlorinated naphthalene, 100 gm. paraffine wax and 100 gm. Japan wax. This mixture may be termed the "wax mass". Next a wax mixture is prepared as follows: To 20 gm. of the above wax mass, there may be added 20 gm. sulfonated castor oil (70%), 10 gm. sodium stearate and 60 gm. water. The wax mass, sulfonated castor oil and sodium stearate are heated together to a temperature of about 75 degrees C., and the water is added with rapid stirring. The mixture, as a whole, should be stirred rapidly until it has cooled, when it sets to a semi-solid or thick, cream-like mass. An emulsifier may be prepared as follows: To 400 gm. corn starch, there may be added 500 gm. sulfonated castor oil (70%) and 800 gm. water. This mixture is heated on the water bath until gelatinization takes place, when, upon cooling, it appears as a stiff yellow paste, somewhat resembling petroleum jelly in appearance and feel. There should now be prepared a gelatin solution by dissolving 900 gm. of gelatine in 3000 cc. of water. From the four compounds above described, I now prepare an emulsion as follows: There are placed in a suitable vessel 50 gm. sulfonated castor oil (70%), 100 gm. wax mixture, 50 gm. wax mass, 50 gm. hydrogenated vegetable fat (the well-known trade product sold as "Crisco" will serve the purpose) and 20 gm. heavy hydrocarbon oil. This part may be designated as constituent #1.

In a suitable vessel, there are placed 50 gm. starch-sulfonated oil paste (above formula), 300 cc. water, 100 cc. gelatin solution (above formula) and, 10 gm. glycerin. These materials are warmed together, when they mix thoroughly on stirring, and may be designated as constituent #2.

Both constituents #1 and #2 are now warmed to a temperature of approximately 70 degrees C., and the water soluble portion (constituent #2) poured into the water insoluble portion (constituent #1) with rapid stirring. The two constituents emulsify with great ease, giving a thick cream-colored mass, which at the temperature of 55 deg. C. possesses the correct body for the production of stencils. A porous base sheet may now be drawn over the surface of or through the emulsion, and then over a rod or wire to remove the excess, and hung up to dry. After a period of approximately 12 to 24 hours the sheet will bear an ink-impervious coating or film, stencilizable by means of a typewriter or stylus, and capable of producing large numbers of copies on the usual types of duplicating machines.

If it be desired, for greater strength and toughness, to coagulate the protein in the above emulsion, after the emulsion has been prepared but before application to the base sheets, there may be stirred into the mass 5 cc. formaldehyde .(40% solution) and then 5 cc. 26 deg. Bé. aqua ammonia. The ammonia has the effect of converting the formaldehyde into hexamethylene tetramine, which acts as a coagulant but more slowly than formaldehyde alone, which, however, will nevertheless act as a satisfactory coagulant.

Owing to the tendency of protein and protein-like substances such as gelatin to mold or to be attacked by bacteria, there may be added to the mass a preservative in some form, and this may be either water- or oil-soluble. Phenol, thymol, beta naphthol and numerous other well-known antiseptic or disinfectant substances which will emulsify with the above mass are suitable for the purpose.

In preparing these emulsions of protein and protein-like substances with oil soluble substances, I do not restrict myself to the necessity of adding a special emulsifying agent such as the starch-sulfonated oil paste, since where a part of the oil and wax mass is replaced by a portion of wool fat and certain other fatty substances capable of holding appreciable percentages of moisture, these substances may act as an emulsifying agent.

Neither do I restrict myself to the percentages of the various constituents nor to the kind or character of protein and protein-like substances or other dispersable colloids, for it appears that a wide range of colloids soluble in water, dilute alkalis and other dispersing mediums are suitable, nor to the nature of the wax, nor to the nature of the oil soluble portion of the mass. Furthermore, a wide range of coagulants and also a large number of disinfectant materials may be used.

I claim:

1. A stencil sheet coating composition consisting of a colloid dispersed in water and an emulsifying agent comprising a starch sulfonated oil mixture.

2. A stencil sheet coating composition, consisting of a water solution of gelatin and a mixture of fats and oils brought into the emulsified state by means of gelatinized starch.

3. The process of producing an emulsion for forming a homogeneous film upon a porous base sheet which consists in subjecting to suitable agitation a water solution of a colloid with a mixture of water insoluble modifying-agents in the presence of gelatinized starch and applying the emulsion so formed to said porous sheet.

This specification signed this 22nd day of May, 1925.

ALEX BROOKING DAVIS.